(12) United States Patent
Fauteux et al.

(10) Patent No.: US 6,224,995 B1
(45) Date of Patent: *May 1, 2001

(54) THREE DIMENSIONAL FREE FORM BATTERY APPARATUS

(75) Inventors: Denis G. Fauteux, Acton; Robert Rounds, III, Boston; Michael Farina, Waltham, all of MA (US)

(73) Assignee: Mitsubishi Chemical Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/344,997

(22) Filed: Jun. 25, 1999

Related U.S. Application Data

(63) Continuation-in-part of application No. 09/179,116, filed on Oct. 26, 1998, now Pat. No. 6,040,078, which is a continuation-in-part of application No. 08/812,021, filed on Mar. 6, 1997, now Pat. No. 5,853,917.

(51) Int. Cl.$^7$ .................................................. H01M 6/00
(52) U.S. Cl. ................... 429/48; 429/57; 429/59; 429/60; 429/163; 429/231.9; 429/231.95; 29/623.1
(58) Field of Search ..................... 429/48, 57, 59, 429/60, 163, 231.9, 231.95; 29/623.1

(56) References Cited

U.S. PATENT DOCUMENTS

| | | | |
|---|---|---|---|
| 1,981,533 | 11/1934 | Williams | 175/315 |
| 4,064,329 | 12/1977 | Naylor | 429/174 |
| 4,186,246 | 1/1980 | Sugalski | 429/60 |
| 4,278,744 | 7/1981 | Athearn | 429/181 |
| 4,374,186 | 2/1983 | McCartney et al. | 429/154 |
| 4,409,304 | 10/1983 | Gerard et al. | 429/158 |
| 4,582,767 | 4/1986 | Morioka et al. | 429/121 |
| 4,889,777 | 12/1989 | Akuto | 429/162 |
| 5,134,046 | 7/1992 | Chow et al. | 429/176 |
| 5,326,653 | 7/1994 | Chang | 429/162 |
| 5,374,490 | 12/1994 | Aldecoa | 429/152 |
| 5,401,595 | 3/1995 | Kagawa et al. | 429/152 |
| 5,432,017 | 7/1995 | Hassemer et al. | 429/4 |
| 5,445,906 | 8/1995 | Hobson et al. | 429/162 |
| 5,503,948 | 4/1996 | MacKay et al. | 429/152 |
| 5,621,618 | 4/1997 | Komiyama | 361/732 |
| 5,704,803 | 1/1998 | Oshima et al. | 439/500 |
| 5,744,261 | 4/1998 | Muffoletto et al. | 429/131 |
| 6,040,078 | * 3/2000 | Fauteux et al. | 429/57 |

* cited by examiner

*Primary Examiner*—Bruce F. Bell
(74) *Attorney, Agent, or Firm*—Factor & Partners

(57) ABSTRACT

A battery apparatus comprising a casing, at least two stacked lithium ion cells a member for maximizing the utilization of the casing and a member for precluding inadvertent deformation of the casing. The casing includes a non-uniform inner periphery. Each of at least two stacked lithium ion cells is positioned within the casing. The utilization maximizing member maximizes the utilization of the inner periphery of the casing by facilitating the independent shaping of each of the at least two stacked lithium ion cells to confirm to the inner periphery. As a result, the shape of one cell does not limit or dictate the shape of any other cell. The deformation precluding member is associated with each of the at least two lithium ion cells, and, substantially precludes inadvertent deformation of the casing by the at least two lithium ion cells, during cell cycling and storage. The invention further includes a process for fabricating a battery apparatus.

11 Claims, 3 Drawing Sheets

THREE DIMENSIONAL FREE FORM BATTERY APPARATUS

Figure 1:
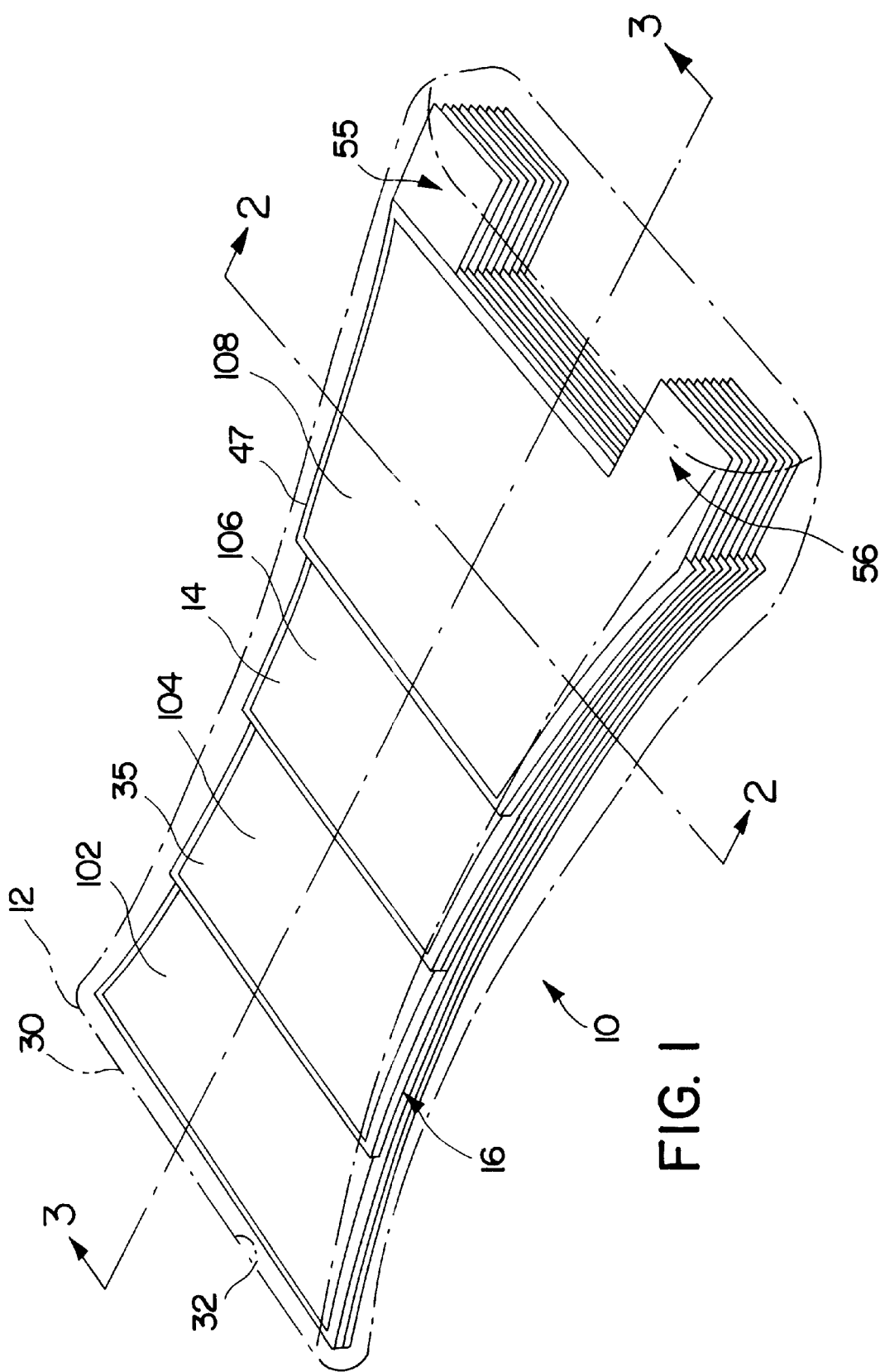

This is a continuation-in-part of U.S. application Ser. No. 09/179,116, filed on Oct. 26, 1998, now U.S. Pat. No. 6,040,078 which is a continuation-in-part of U.S. application Ser. No. 08/812,021 filed on Mar. 6, 1997 now U.S. Pat. No. 5,853,917.

BACKGROUND OF THE INVENTION

1. Field of the Invention

The present invention relates in general to electrochemical cells/batteries, and more particularly, to an electrochemical cell that comprises stackable lithium ion batteries which may have any three dimensional freeform geometric configuration and which require only a lightweight casing.

2. Background Art

Lithium ion rechargeable batteries for use in all types of applications are well known in the art. Generally, lithium batteries are desirable over other types of rechargeable batteries, including nickel cadmium and nickel metal hydride batteries, due to their lighter weight, energy density and overall efficiency, among other advantages.

Generally, it is desirable to have as light of a battery as possible. Indeed current lithium ion batteries have been produced which have the capacity and the cyclability for use in all types of consumer devices, including, but not limited to portable telephones and lap top computers. However, the current batteries utilize relatively heavy and cumbersome casings.

In particular, battery casings generally comprise a rigid and heavy material in a generally cylindrical or prismatic shape. The rigid material prevents buckling of the casing which is caused by internal pressures. The internal pressures are derived from the generation of gas through the decomposition of the electrolyte or of various constituents within the battery. In addition, the casings are typically nickel plated steel which reduces the likelihood of corrosion.

Further, especially in prismatically shaped cells, the individual cells that comprise a battery are generally strongly biased against each other through the use of spring plates. The use of strong spring plates increases the weight of the battery. In addition, the spring plates occupy space which could otherwise be used for additional cells which could then increase the capacity of the battery.

Lastly, these batteries, due to the necessary housings and spring plates to apply uniform pressure onto the cells, are generally available in common, simple configurations, such as cylinders, prisms, cubes and other box-like shapes and configurations. As such, where the battery container is of a shape that is not such a common shape, the prior art utilizes conventionally shaped batteries within the non-uniform battery container. As a result, a portion of the space within the battery container remains empty, and, in turn, comprises dead space.

SUMMARY OF THE INVENTION

The battery apparatus of the present invention comprises a casing, at least two stacked lithium ion cells, means for maximizing the utilization of the casing and means for substantially precluding inadvertent deformation of the casing. Each of the at least two stacked lithium ion cells are electrically associated with each other and positioned within the casing. The utilization maximizing means maximizes the utilization of the inner periphery of the casing by the cells. The deformation preclusion means is operatively associated with the lithium ion cells. The deformation preclusion means substantially precludes inadvertent deformation of the at least two lithium ion cells during cell cycling and storage.

In a preferred embodiment, the deformation preclusion means comprises means for substantially precluding gas generation within the cell. The gas generation preclusion means substantially precludes gas generation within the cell during decomposition of chemical constituents within the cells, during cell cycling and storage.

Preferably, the utilization maximizing means comprises the shaping of each of the cells independently, to the shape of the inner periphery of the casing. In one such embodiment, each of the at least two lithium ion cells comprises a freeform geometric configuration. In such an embodiment, the shape of any one of the cells is independent relative to any of the other cells.

In a preferred embodiment, the at least two stacked lithium ion cells comprise at least two groups of at least two stacked lithium ion cells. In such an embodiment, at least one group of at least two stacked lithium ion cells comprises a freeform shape that is different than the other of the at least two groups of at least two stacked lithium ion cells.

In another preferred embodiment, at least one of the at least two groups of stacked lithium ion cells comprises at least two stacked lithium ion cells which are formed in a monolithic construction. Inasmuch as the contemplated lithium ion cells are substantially precluded from the generation of the cells may be of a monolithic construction, or may otherwise be maintained in a stacked orientation, without requiring the aid of windings, springs, clamps or other rigid retaining structures.

The invention further includes a process for fabricating a battery apparatus. The process includes the step of forming a casing having a non-uniform periphery for housing the at least two stackable lithium ion cells. Next, the process includes the step of fabricating the at least two lithium ion cells. This step comprises the step of shaping each of the cells so as to maximize the utilization of the inner periphery of the casing and the step of associating a chemical compound within the cells. The chemical compound substantially precludes inadvertent deformation of the casing by the cells during cell cycling and storage, once the cells are positioned in the casing. Lastly, the process includes the step of positioning the at least two stackable lithium ion cells within the casing.

In another preferred embodiment, the step of shaping the cells comprises the step of shaping the cells in a free-form geometric configuration.

In yet another preferred embodiment, wherein each cell includes a first electrode having a carbonaceous surface, a second electrode and an electrolyte which includes a solvent, the step of associating a chemical compound comprises the step of associating the chemical compound with the carbonaceous surface of the first electrode. This forms a passivating layer which substantially precludes association of the solvent of the electrolyte with the carbonaceous surface. In addition, the step of associating a chemical compound further comprises the step of decomposing the electrolyte to form a passivating layer during cell cycling and storage without generating any significant amounts of gas during such decomposition.

BRIEF DESCRIPTION THE DRAWINGS

Figure 2:
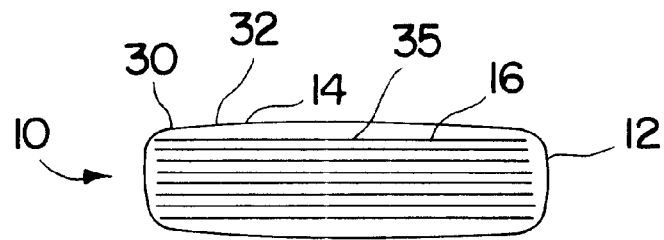
Figure 3:
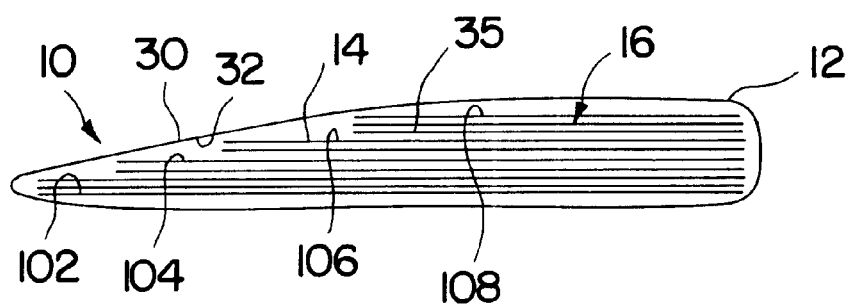
Figure 4:
Figure 5:
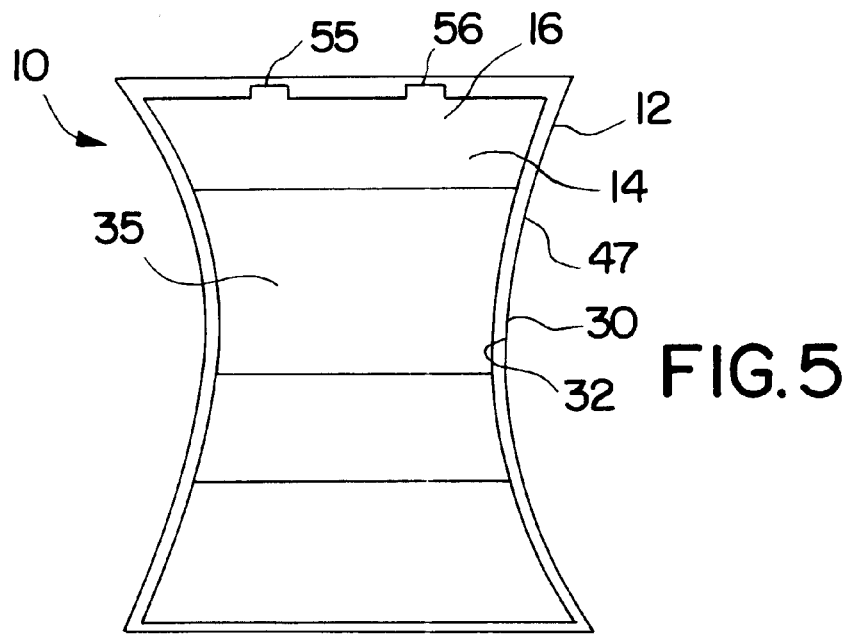
Figure 6:
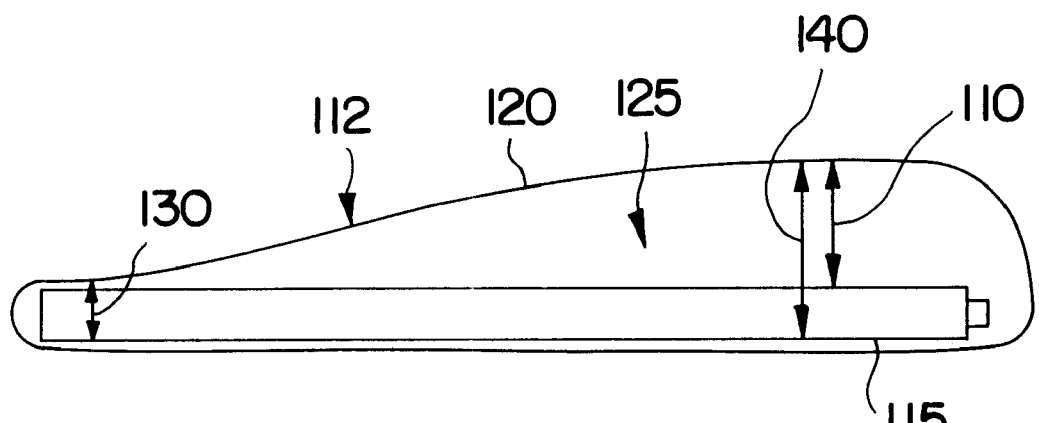

FIG. 1 of the drawings is a perspective view of a battery apparatus of the present invention;

FIG. 2 of the drawings is a cross-sectional view of the battery apparatus of FIG. 1 taken generally about lines 2—2 of FIG. 1;

FIG. 3 of the drawings is a cross-sectional view of the battery apparatus of FIG. 1 taken generally about lines 3—3 of FIG. 1;

FIG. 4 of the drawings is a cross-sectional view of the casing for the battery of FIG. 3;

FIG. 5 of the drawings is a top plan view of freeform geometric configuration of the lithium ion cell of the present invention;

FIG. 6 of the drawings is a cross-sectional view of a prior art battery; and

Figure 7:
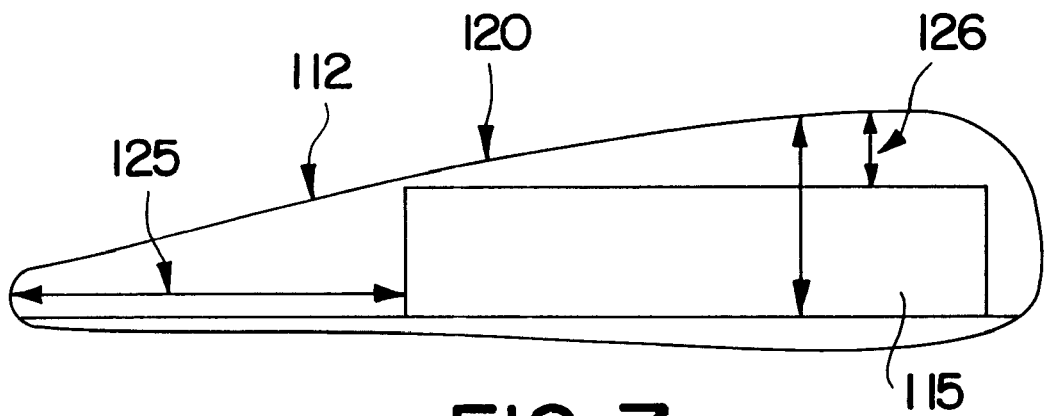

FIG. 7 of the drawings is a cross-sectional view of a second prior art battery.

BEST MODE OF THE INVENTION

While this invention is susceptible of embodiment in many different forms, there is shown in the drawings and will herein be described in detail, several specific embodiments with the understanding that the present disclosure is to be considered as an exemplification of the principles of the invention and is not intended to limit the invention to the embodiments illustrated.

Battery apparatus 10 is shown in FIGS. 1–3 and 5 as comprising stacked lithium ion cells 14, casing 12 and means 16 for substantially precluding deformation of the lithium ion cells during cell cycling and storage. As shown in FIG. 3, the lithium ion cells are arranged in a stacked configuration and include groups 102, 104, 106 and 108 each of which include outer periphery 47 (FIGS. 1 and 5) and leads 55, 56 (FIG. 1).

Some of the different geometric configurations and, in turn, different outer peripheries 47, of various stacks of stacked lithium ion cells 102–108 can be seen in the embodiments shown in FIGS. 1, 4 and 5. In particular, the shapes may be any freeform geometric configuration. This would include any non-uniform geometric cross-sections, as well as conventional uniform geometric cross-sections. One such freeform geometric configuration is best seen in FIGS. 1 and 5, wherein the shape does not conform to any particular uniform geometric configuration. Further, the freeform geometric configuration of the lithium ion cells may be planar, or may comprise non-planar shapes. In sum, and as will be explained, due to deformation preclusion means 16, the freeform geometric configuration of the cells may comprise any one of a multitude of different configurations, shapes and orientations for the cells.

In addition, as shown in FIG. 1, each subsequent stack 102–108 may include a different outer periphery which may be different than the outer periphery of the adjoining stacks of cells. Thus, as the stack is assembled, not only can the outer periphery of the cells be varied, but the outer periphery of each stack 102–108 can be varied so that the resulting stack may form any desired three dimensional configuration. The ability to vary the outer periphery of each of the cells provides a means for maximizing the utilization of inner periphery 32 of the casing.

For purposes of comparison, a first prior art battery 120 is shown in FIG. 6. The prior art battery includes cells 115 and casing 112. As can be seen, since prior art cells are limited to common uniform geometric shapes, the size of the battery that fits within casing 115 is limited to the thickness of thinnest region 130 of the casing. As a result, interior region 125 comprises wasted space (such as wasted space 110), even though interior region 125 has enough area, with an area 140 to accommodate additional cells, and, in turn, additional capacity.

A second prior art battery is shown in FIG. 7. In this embodiment, the interior region of the battery casing 112 is occupied by a shorter yet thicker battery cell (or cells) 115. Again, since the prior art cells are limited to common uniform geometric configurations, a substantial amount of wasted space results, namely, regions 125 and 126. Again, these spaces would otherwise be available to house additional cells, and, in turn additional capacity. In sum, the prior art batteries have been unable to adapt to any non-uniform 3-D shaped battery configuration as covered by the present invention.

As shown in FIG. 3 and unlike the prior art batteries, with the present means for maximizing the utilization of the inner periphery, wherein each cell in the stack of cells may have any desired outer periphery, substantially the entirety of the inner periphery 32 of the casing can be occupied by cells. This can be accomplished even for non-uniform casings. In fact, virtually any three dimensional geometric shape can be formed.

Various lithium ion based cells are contemplated for use in association with the battery apparatus, including both rechargeable and non-rechargeable types having a variety of electrodes and electrolyte compositions. For example, one particular battery configuration (and associated chemistries) may be seen in co-pending U.S. application Ser. No. 08/812,021 to Dr. Denis G. Fauteux and Jie Shi entitled Electrolytic Cell Having A Controlled Electrode Surface Interface, which disclosure is incorporated by reference.

Casing 12 is shown in FIGS. 1–3 as comprising outer configuration 30 and inner periphery 32 (FIGS. 2 and 3). Inner periphery 32 may comprise any configuration which can properly accept the stacked lithium ion cells 14. Thus, the inner periphery is not limited to a particular shape, and, for example, the inner periphery may closely follow the outer periphery/contours of the lithium ion cell so that the inner periphery of the casing mates with the outer periphery of the cells. As such, when the stacks 102–108 are positioned with the casing, each stack can have a different outer periphery so that the dead space and/or unused space with the interior region can be minimized. While a multitude of materials are contemplated for use, the casing may comprise a metal, plastic or a laminated metal/plastic material and the casing material may be quite thin, e.g. between 0.3 and 0.4 mm. It is also contemplated that the thickness of the casing material may be between 0.25 and 0.35 mm. Thus, the casing is relatively lightweight.

Deformation preclusion means 16, as shown in FIG. 3, may comprise means 35 for substantially precluding the generation of gas during cell cycling and storage. One such gas generation preclusion means is disclosed in the above-identified co-pending application Ser. No. 08/812,021. Through such means for substantially precluding the generation of gas, the cells retain the desired orientation and generally maintain their integrity without the aid of outside rigidifying structures and without the application of uniform pressure against the stacked cells. Indeed, with such deformation preclusion means, the use of a casing that includes wire bindings, strong metal casings and biasing springs is not necessary to maintain the desired orientation of the cell, and to prevent the eventual deformation of the casing.

As a result, a lightweight and relatively thin casing can be utilized without any additional cumbersome and heavy rigidifying components. Moreover, not only can the overall weight of the battery apparatus be reduced, but space which was previously occupied by wire bindings, metal casings and biasing springs can be utilized to house further stacked lithium ion cells or larger individual cells. Thus, the capacity or power generation can be increased without increasing the overall size of the battery apparatus.

In addition, without the build-up of excess pressure within the cells, it is not necessary to apply otherwise required uniform pressure against the stacked lithium ion cells. Thus, outer periphery shape 47 of stacked lithium ion cells 14 are not limited to common square and rectangular box-like shapes but, as explained above, may take on any number of freeform geometric configurations, as best seen in FIGS. 1 and 5. In addition, each one of stacks 102–108 which for stack of cells 14 may be of a different outer peripheral configuration.

To manufacture battery apparatus 10, the desired shape of the casing 12 for the particular application and capacity and shape of the stacked lithium ion cells 14 is determined. Subsequently, casing 12 having inner periphery 32 and outer configuration 30 is formed which will house the stacked lithium ion cells. While inner periphery 32 of the casing need not follow outer periphery 47 of the stacked lithium ion cells, it is necessary that the casing is sized so as to be able to house the stacked lithium ion cells.

Once the casing is formed, lithium ion cells 14 are fabricated from stacks 102–108. Each of stacks 102–108 can be formed having any desired outer peripheral shape. Once formed, the stacks 102–108 can themselves be stacked to form lithium ion cells stack 14. Any number of stacks 102–108, each having any desired peripheral shape, may be formed and orientated in a stacked configuration. In addition, each of stacks 102–108 may comprise a monolithic construction comprising a desired quantity of cells. Again, the configuration of any of the stacks is not limited to the shape of any adjoining stack.

In particular, the fabrication of the cells comprises the inclusion of deformation preclusion means 16. In one embodiment, deformation preclusion means 16 comprises the inclusion of a chemical compound within each of the lithium ion cells which will substantially preclude inadvertent deformation of the casing by the generation of gas which would otherwise typically occur upon decomposition of, for example, the electrolyte during formation of the passivating layer formed on an associated electrode during cell cycling and storage.

One such stackable lithium ion cell and the fabrication of same is fully disclosed in the above-identified co-pending application Ser. No. 08/812,021. As explained therein, such a cell includes a first electrode having a carbonaceous surface, a second electrode and an electrolyte having a solvent. The chemical compound is associated with the carbonaceous surface of the first electrode. In turn, a passivating layer is formed which substantially precludes the association of the solvent in the electrolyte with the carbonaceous surface of the first electrode. In such a cell, the decomposing of the electrolyte during the formation of the passivating layer during cell cycling and storage is substantially devoid of any gas generation. Thus, the integrity of the cells can be maintained, and, in turn, the casing for such a battery will not require any internal or external components for receiving the cells within the casing—as would be required for cells which generate a gas upon decomposition of the electrolyte.

Once the lithium ion cells are formed, they are positioned within the casing, and the proper leads 55, 56 are attached to the cells so as to provide contacts for the battery apparatus. As explained above, due to the deformation preclusion means, the casing and each of stacks 102–108 of lithium ion cell stack 14 may be configured in any number of freeform shapes, to in turn, form any three dimensional stack shapes and configurations without the addition of cumbersome retention structures such a biasing springs, wire wraps and heavy metal casings. In addition, the dead space/unused space within a casing can be minimized.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A battery apparatus comprising:
   a casing having a non-uniform inner periphery;
   at least two stacked lithium ion cells positioned within the casing;
   means for maximizing the utilization of the inner periphery of the casing; and
   means operatively associated with each of the at least two lithium ion cells for substantially precluding inadvertent deformation of the casing by the at least two lithium ion cells, during cell cycling and storage.

2. The battery apparatus according to claim 1 wherein the deformation preclusion means comprises each of the at least two cells including means for substantially precluding gas generation within the cell during decomposition of chemical constituents within the cell during cell cycling and storage.

3. The battery apparatus according to claim 1 wherein the utilization maximization means comprises each of the at least two stacked cells having shapes which collectively conform to the shape of the inner periphery of the casing.

4. The battery apparatus according to claim 3 wherein each of the at least two stacked lithium ion cells comprises a freeform geometric configuration, to, in turn follow the inner periphery of the casing.

5. The battery apparatus according to claim 3 wherein at least one of the at least two stacked lithium ion cells comprises a freeform geometric configuration different from that of the other of the at least two stacked lithium ion cells, to, in turn, follow the inner periphery of the casing.

6. The battery apparatus according to claim 5 wherein at least one group of at least two stacked lithium ion cells has a freeform shape that is different from that of the other of the at least two groups of at least two stacked lithium ion cells to, in turn, follow the inner periphery of the casing.

7. The battery apparatus according to claim 1 wherein the at least two stacked lithium ion cells comprises at least two groups of at least two stacked lithium ion cells, and the utilization maximization means comprises each of the at least two stacked cells having shapes which collectively conform to the inner periphery of the casing.

8. The battery apparatus according to claim 6 wherein at least one of the at least two groups of at least two stacked lithium cells comprise a monolithic constructions.

9. A process for fabricating a battery apparatus comprising the steps of:
   forming a casing for housing at least two stackable lithium ion cells, the casing having a nonuniform inner periphery;
   fabricating at least two lithium ion cells including the step of
   shaping each of the at least two lithium ion cells so as to maximize the utilization of the inner periphery of the casing by the cells;

associating a chemical compound within each cell which will substantially preclude inadvertent deformation of the casing, after positioning of the cells therein, by the cell during cell cycling and storage;

stacking the at least two lithium ion cells to form a stack; and positioning the at least two stackable lithium ion cells within the casing wherein the stack of cells closely follows the non-uniform inner periphery of the casing.

10. The process according to claim 9 wherein the step of shaping the at least two lithium ion cells comprises shaping the cells in a free form geometric configuration.

11. The process according to claim 9 wherein each cell includes a first electrode having a carbonaceous surface, a second electrode and an electrolyte having a solvent, the step of associating a chemical compound comprises the steps of:

associating the chemical compound with the carbonaceous surface of the first electrode, to, in turn, form a passivating layer which substantially precludes association of the solvent of the electrolyte with the carbonaceous surface; and decomposing the electrolyte to form a passivating layer during cell cycling and storage without generating any significant amounts of gas during such decomposition.

\* \* \* \* \*